United States Patent
Papandreas (10) Patent No.: US 8,220,245 B1
(45) Date of Patent: Jul. 17, 2012

(54) MULTI SPOOL GAS TURBINE SYSTEM

(75) Inventor: Emanuel Papandreas, Indianapolis, IN (US)

(73) Assignee: Candent Technologies, Inc., Greenfield, IN (US)

(*) Notice: Subject to any disclaimer, the term of this patent is extended or adjusted under 35 U.S.C. 154(b) by 1210 days.

(21) Appl. No.: 11/495,495

(22) Filed: Jul. 28, 2006

Related U.S. Application Data (60) Provisional application No. 60/705,028, filed on Aug. 3, 2005.

(51) Int. Cl.
F02C 1/06 (2006.01)
(52) U.S. Cl. .................................. 60/39.163
(58) Field of Classification Search .............. 60/39.163, 60/791, 793
See application file for complete search history.

(56) References Cited

U.S. PATENT DOCUMENTS

| | | | |
|---|---|---|---|
| 3,199,293 A | 8/1965 | Starkey | |
| 3,237,404 A | 3/1966 | Flanigan et al. | |
| 3,249,187 A * | 5/1966 | McDowall | 192/48.5 |
| 3,383,090 A | 5/1968 | McLean | |
| 3,521,446 A | 7/1970 | Maljanian | |
| 3,546,879 A | 12/1970 | Hass | |
| 3,585,795 A | 6/1971 | Grieb | |
| 3,606,754 A | 9/1971 | White | |
| 3,660,976 A | 5/1972 | Canale | |
| 3,706,201 A * | 12/1972 | Williamson | 60/39.281 |
| 3,771,916 A * | 11/1973 | Flanigan et al. | 417/319 |
| 3,835,642 A * | 9/1974 | Amann | 60/39.163 |
| 3,899,877 A | 8/1975 | Flanigan et al. | |
| 3,941,015 A | 3/1976 | Robinson | |
| 3,952,502 A | 4/1976 | Davis et al. | |
| 3,999,374 A | 12/1976 | Oppmann et al. | |
| 4,041,696 A * | 8/1977 | Morrison | 60/790 |
| 4,044,552 A | 8/1977 | West | |
| 5,562,190 A * | 10/1996 | McArthur | 192/57 |
| 6,035,629 A * | 3/2000 | Hilgeman et al. | 60/773 |
| 6,134,880 A * | 10/2000 | Yoshinaka | 60/226.1 |
| 7,021,062 B2 * | 4/2006 | Tanaka et al. | 60/773 |
| 7,175,342 B2 * | 2/2007 | Tanaka et al. | 374/55 |
| 2006/0010875 A1 * | 1/2006 | Mahoney et al. | 60/772 |
| 2007/0183554 A1 * | 8/2007 | Yanai et al. | 376/211 |

FOREIGN PATENT DOCUMENTS

| | | |
|---|---|---|
| EP | 0092501 A2 | 10/1983 |
| EP | 06 254 020.8 | 3/2010 |
| FR | 2197111 A1 | 3/1974 |
| GB | 711788 A | 7/1954 |

OTHER PUBLICATIONS

Canadian Office Action for related case dated Dec. 30, 2008.

* cited by examiner

*Primary Examiner* — Louis Casaregola
*Assistant Examiner* — Phutthiwat Wongwian
(74) *Attorney, Agent, or Firm* — Edwards Wildman Palmer LLP; George N. Chaclas (57) ABSTRACT

A gas turbine engine is provided, including an air inlet in fluid communication with a compressor, a combustor, a compressor turbine, and a power turbine. The compressor and compressor turbine may be mounted on a first drive shaft, and the power turbine may be mounted on a second shaft. The engine further includes an engagement mechanism adapted to selectively engage the first drive shaft to the second drive shaft, wherein the first drive shaft and second drive shaft rotate at substantially the same speed when the engagement mechanism is engaged. The disclosed multi-spool gas turbine engine provides improved part power fuel consumption at reduced output shaft speeds. The proposed invention can relate to turbines with two or more gas generator spools.

17 Claims, 6 Drawing Sheets

MULTI SPOOL GAS TURBINE SYSTEM

CROSS-REFERENCE TO RELATED APPLICATION

This application claims the benefit of priority from U.S. Provisional Patent Application Ser. No. 60/705,028 filed Aug. 3, 2005, the disclosure of which is incorporated by reference herein in its entirety.

BACKGROUND OF THE INVENTION

1. Field of the Invention

The present invention relates to gas turbine engines, and relates more particularly to an improved gas turbine engine and method and control system therefore particularly useful as the power plant for a ground vehicle or advanced rotorcraft.

2. Description of Related Art

A variety of gas turbine devices are known in the art for generating useful work by combusting fuel mixtures. Of such devices, many gas turbine are directed to powering vehicles, such as ground, water and air vehicles.

Gas turbine engine fuel efficiency has improved in recent years to levels typically associated with reciprocating engines. In most cases, gas turbine engines have displaced reciprocating engines as the engine of choice for larger aircraft as a result of their relative light weight, high power output and greater reliability. However, for applications such as the next generation of advanced helicopters and ground vehicles, the ability to efficiently deliver power at lower output shaft speeds remains a challenge. Typical gas turbine engines for these applications are of the free turbine type, that is, the output turbine is driven by the gases produced by a gas generator system. This approach is satisfactory when the output speed of the system is within a narrow speed range, but as the output speed of the engine drops, the power turbine efficiency falls off.

Vehicles, such as advanced unmanned helicopters, are expected to utilize variable speed rotor systems that reduce the speed of the main rotor to improve aerodynamic efficiency. In order to take advantage of this significant improvement in rotor efficiency, the engine must be capable of providing low fuel consumption at an output shaft speed of roughly half of that required for takeoff conditions. Attempting to operate a conventional free turbine engine at output shaft speeds lower than 75% typically results in a loss of power turbine rotor efficiency. What physically occurs is that the turbine loading, in terms of work per unit airflow remains constant, while the speed decreases, robbing the turbine of work capability. This results in overloading of the turbine and reduced turbine efficiency. At the same time, the gas generator turbine experiences a reduced loading since the work being done by the gas generator rotor is reduced as the engine slows down and the inlet airflow and pressure ratio decreases.

Discussions of exemplary prior art gas turbine engine structures may be found in U.S. Pat. Nos. 3,237,404, 3,660, 976, 3,899,877 and 3,941,015. These references are generally directed to schemes for transmitting motive power from the gas generator to the engine output shaft. The positive performance benefits of coupling the output turbine to the gas generator have been shown by the prior art (e.g., Woodhouse et all, and Flanigan et all). However, these prior art systems are all based on concepts in which there was a fundamental speed difference between the shafting systems being coupled, and therefore these systems required the addition of gear trains to accommodate these speed differences. However, such systems, in employing intermediate gearing, add significant expense complexity and weight to the system. Thus, there remains a continuing need in the art for improved gas turbine engine systems that address the above concerns. The present invention provides a solution for these problems.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a gas turbine engine having an air inlet, a compressor, a combustor, a compressor turbine, a power turbine and an engagement mechanism. Particularly, the engine includes an air inlet for permitting the inflow of air to create a fuel mixture. The engine also includes a compressor downstream from and in fluid communication with the air inlet for compressing air traversing the air inlet. A combustor downstream from and in fluid communication with the compressor is also provided for combusting a fuel mixture. A compressor turbine is also provided downstream from and in fluid communication with the combustor. The compressor turbine is operably connected to the compressor by a first drive shaft, and is adapted to generate power from a combusted fuel mixture passing therethrough to power the compressor. The engine further includes a power turbine downstream from and in fluid communication with the combustor and if desired, the compressor turbine. The power turbine is adapted to generate power to power a load external to the engine. The power turbine is mounted on a second drive shaft distinct from the first drive shaft. The engine also includes an engagement mechanism adapted to selectively engage the first drive shaft to the second drive shaft, wherein the first drive shaft and second drive shaft rotate at substantially the same speed when the engagement mechanism is engaged.

In accordance with a further aspect of the invention, the compressor can be a low pressure compressor, and the compressor turbine can be a low pressure compressor turbine. In accordance with this embodiment of the invention, the engine can further include a high pressure compressor and a high pressure compressor turbine. Specifically, the high pressure compressor is preferably situated downstream from and in fluid communication with the low pressure compressor. The high pressure compressor turbine is preferably downstream from and in fluid communication with the combustor. The high pressure compressor turbine is preferably operably connected to the high pressure compressor by a third drive shaft. The high pressure compressor turbine is adapted to generate power from a combusted fuel mixture passing therethrough to power the high pressure compressor.

In accordance with another aspect of the invention, the engagement mechanism may be a clutch. In accordance with one embodiment of the invention, the clutch may include a first dog including a first plurality of splines affixed to the first drive shaft, and a second dog having a second plurality of splines affixed to the second drive shaft, wherein the first plurality of splines and second plurality of splines intermesh when the clutch is in an engaged condition. In accordance with another embodiment of the invention, the clutch may include at least one clutch plate adapted and configured to engage at least one pressure plate to couple the first drive shaft to the second drive shaft. The clutch may also be a hydraulic clutch. If desired, the engagement mechanism may allow a controlled amount of slippage between the first drive shaft and the second drive shaft.

In accordance with a further aspect of the invention, the first drive shaft and second drive shaft may rotate about substantially the same axis of rotation. In accordance with one embodiment of the invention, an engine with three drive shafts is provided wherein the first drive shaft, second drive shaft and third drive shaft may all rotate about substantially the same axis of rotation. Alternatively, if desired, the first drive shaft and second drive shaft may rotate about a first axis of rotation and the third drive shaft may rotate about a second axis of rotation that is different from the first axis of rotation. As such, the second axis of rotation may be oriented substantially parallel to the first axis of rotation, substantially perpendicular to the first axis of rotation, or may be oriented at any suitable angle with respect to the first axis of rotation.

In accordance with still a further aspect of the invention, a gas turbine engine may be provided further including a control system. The control system is preferably adapted to control fuel flowing to the combustor in relation to the demand of an operator. If desired, the control system may be further adapted to control the engine in response to at least one signal representative of the speed of the first drive shaft and second drive shaft. If desired, the control system can additionally or alternatively control the engine in response to the temperature of gases flowing through the engine. If desired, the control system may include a machine readable program tangibly embodied on a computer readable medium. The program contains instructions for controlling the engagement and disengagement of the engagement mechanism based on the operating condition of the engine. The control system may be adapted to operate the engine in a first operating mode wherein the engagement mechanism is disengaged, and in a second operating mode wherein the engagement mechanism is engaged. If desired, the operator may have the option to manually specify when the engine changes between the first operating mode and the second operating mode.

In accordance with another aspect of the invention, the engine embodied herein can be incorporated into a variety of air, marine and land vehicles, or stationary power applications, as desired. For example, in accordance with one aspect of the invention, a helicopter is provided including a gas turbine engine as described herein, and a rotor driven by the gas turbine engine. Preferably, the helicopter operates in the first operating mode during takeoff and landing, and can operate in the second operating mode during a cruising operation, as desired. In accordance with another aspect of the invention, a marine propulsion system is provided. The system includes a gas turbine engine as described herein, and a propeller driven by the gas turbine engine. Preferably, the system operates in the first operating mode when the propeller is in the water, and is configured to operate in the second operating mode when the propeller leaves the water.

In accordance with yet another aspect of the invention, the gas turbine engine disclosed herein may further include a heat exchanger disposed between and in fluid communication with the low pressure compressor and the high pressure compressor. The heat exchanger is preferably adapted to remove heat from fluid passing from the low pressure compressor to the high pressure compressor to increase the efficiency of the engine. If desired, the engine may additionally or alternatively include a heat exchanger adapted to direct heat from the exhaust of the engine to fluid leaving the high pressure compressor, thereby increasing engine efficiency.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

The devices and methods presented herein may be used in a variety of contexts, including vehicle propulsion and/or power generation. The present invention is particularly suited for use in helicopters that operate with relatively low and/or variable rotor speeds. The present invention provides advantages in cost and simplicity relative to prior art by designing a gas turbine in which the low pressure spool and the output shafting may be directly selectively coupled to improve the part power efficiency of the engine.

In accordance with the invention, a gas turbine engine is provided, including an air inlet in fluid communication with a compressor, a combustor, a compressor turbine, and a power turbine. The compressor and compressor turbine may be mounted on a first drive shaft, and the power turbine may be mounted on a second shaft. The engine further includes an engagement mechanism adapted to selectively engage the first drive shaft to the second drive shaft, wherein the first drive shaft and second drive shaft rotate at substantially the same speed when the engagement mechanism is engaged. The disclosed multi-spool gas turbine engine provides improved part power fuel consumption at reduced output shaft speeds.

Figure 1:
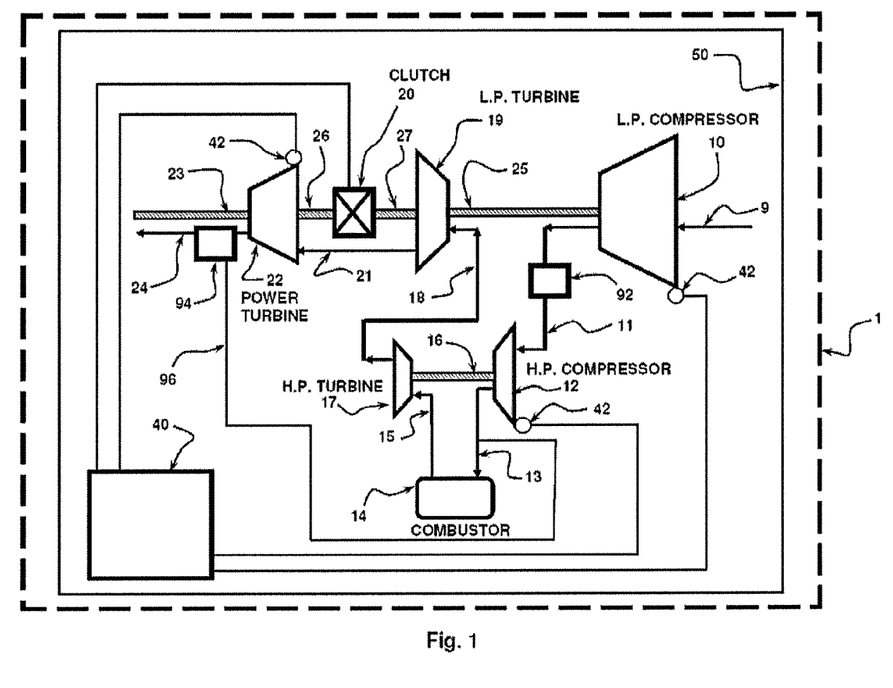
FIG. 1 shows a block diagram illustration of the gas turbine engine and associated drive train embodying the principles of the present invention.
Figure 2:
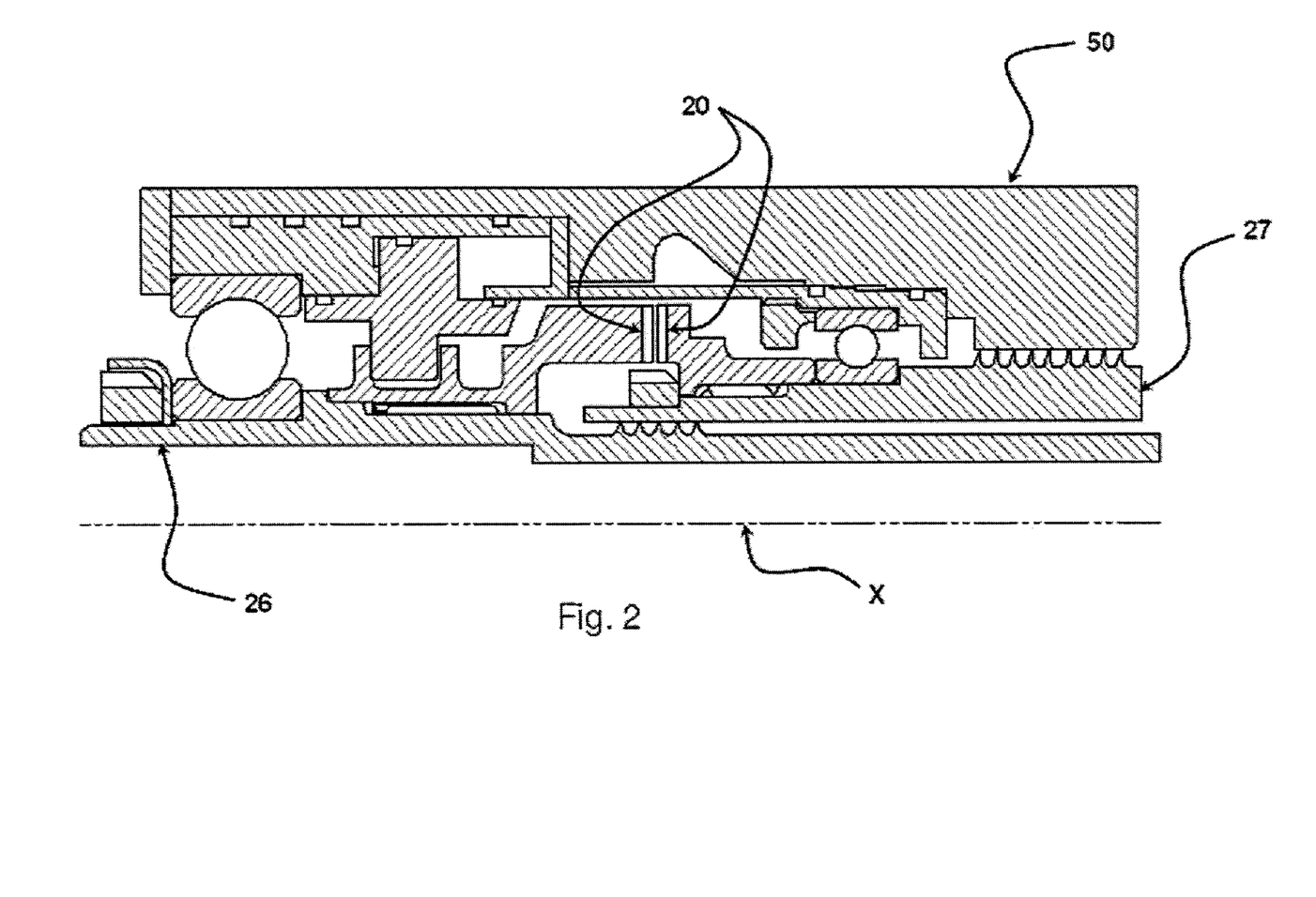
FIG. 2 is a view of a first exemplary embodiment of an engagement mechanism made in accordance with the present invention.

For purpose of explanation and illustration, and not limitation, a partial view of an exemplary embodiment of the gas turbine engine in accordance with the invention is shown in FIG. 1 and is designated generally by reference character 1. Other embodiments of a gas turbine engine in accordance with the invention, or aspects thereof, are provided in FIGS. 2-7, as will be described.

As depicted in FIG. 1, the gas turbine engine 1 according to the present invention is depicted and includes an air inlet 9, which supplies working fluid to a low pressure compressor 10 connected to a fluid delivery connection 11 which passes flow to the high pressure compressor 12. The various portions of gas turbine engine 1 may be housed in one or more housings 50. It will be understood that the design of the housing 50 is not limiting, and depends on the particular application of the engine of the invention. For example, depending on space constraints, it may be desirable to separate housing 50 into two or more segments, housing the low pressure components (e.g., 10, 19) and high pressure components (e.g., 12, 17) of the system separately.

The high pressure compressor 12 serves to further compress the flow and delivers the fluid to the combustor 14 via a flow connection 13. The flow of fuel to combustor 14 is preferably controlled by control system 40, described in detail below, to form a fuel air mixture. Fluid exits the combustion system through a duct 15 and enters a high pressure turbine 17. The high pressure turbine 17 and high pressure compressor 12 are preferably connected in driving relation and are rotatably connected through a shaft 16.

The fluid next exits the high pressure turbine 17 through a duct 18 and enters the low pressure turbine 19 where it is expanded and this work is used to drive the low pressure compressor 10. The low pressure turbine 19, as noted receives working fluid from the high pressure turbine 17 and may drive the low pressure compressor 10 directly via shaft 25.

The fluid next exits the low pressure turbine 19 through a duct 21 and drives the power turbine 22, which extracts further work from the fluid. The extracted power is removed by means of a rotating shaft 23 and directed by shaft 23 to an external load (e.g., power generator, drive train, etc.). As the fluid exits the power turbine 22, it is delivered to the exhaust duct 24 and leaves the engine 1. It will be recognized by those of skill in the art that any suitable number of low pressure stage turbines 19 and compressors 10, high pressure stage turbines 17 and compressors 12 and power turbines 22 may be used, depending on the particular application.

As further depicted in FIG. 1, an engagement mechanism 20, such as a clutch, is provided that allows the low pressure turbine 19 to be selectively coupled to the power turbine 22 which permits operating shaft 26 at substantially the same speed as shaft 27. The clutch 20 may be placed so as to function directly on the shafts, but does not have to necessarily reside directly between the turbines 19 and 22, but may, through hollow nested shafts, reside in the front or rear of the engine as an alternate configuration.

When the engagement mechanism 20 disengaged, the engine 1 depicted in FIG. 1 operates as a three shaft free turbine turboshaft engine. In this case the high pressure rotor (e.g., 12, 16, 17) can operate at speeds and temperatures up to the maximum design condition.

In contrast, when engagement mechanism 20 is engaged, the low pressure spool (e.g., 10, 25, 19, 27) speed can be controlled by means of controlling the power loading and thus the output shaft 23 speed and, in conjunction with fuel flow control, will permit the engine to be operated at lower low pressure spool speeds, but at higher operating temperatures and higher high pressure spool speeds and pressure ratios. That is, the high pressure rotor can run at higher pressure ratios and temperatures while the low pressure rotor (e.g., 10, 25, 19, 27)) speed (and flow rate) is constrained by the load conditions. The low pressure turbine 19 and power turbine 22 now share the power output load and, consequently, maintain good overall engine efficiency.

The net effect is that when the engine is producing approximately 50% power and the engagement mechanism 20 is engaged, the low pressure rotor (e.g., 10, 25, 19, 27) and output shaft 23 is operating at approximately 60% speed while the high pressure rotor (is operating at 100% speed and essentially at a cruise temperature condition. At this operating point the coupled shaft engine has a higher pressure ratio, and operating temperature than that of a free turbine engine, as shown in prior art, and with those operating conditions, the engine will have improved part power fuel consumption. Thus the coupling of the low pressure gas generator and power turbine shafts permits higher engine operating temperatures at part power conditions and offers a significant benefit to fuel efficiency.

A variety of engagement mechanisms 20 can be used. In fact, any suitable selective engagement mechanism can be used to selectively engage the low pressure shaft (e.g., 25, 27) with the power shaft (e.g., 23, 26).

Figure 3:
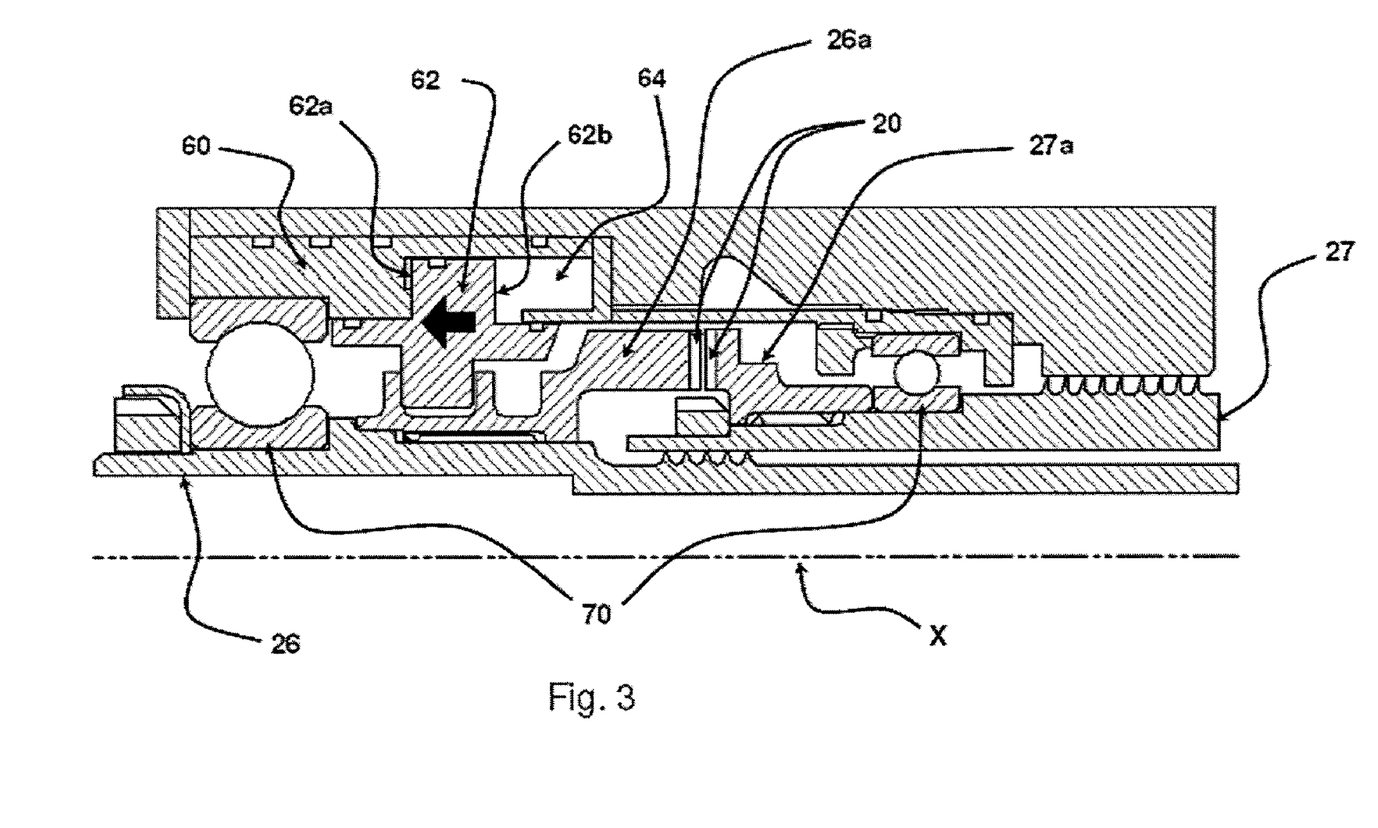
FIG. 3 depicts the engagement mechanism depicted in FIG. 2 in an uncoupled state.
Figure 4:
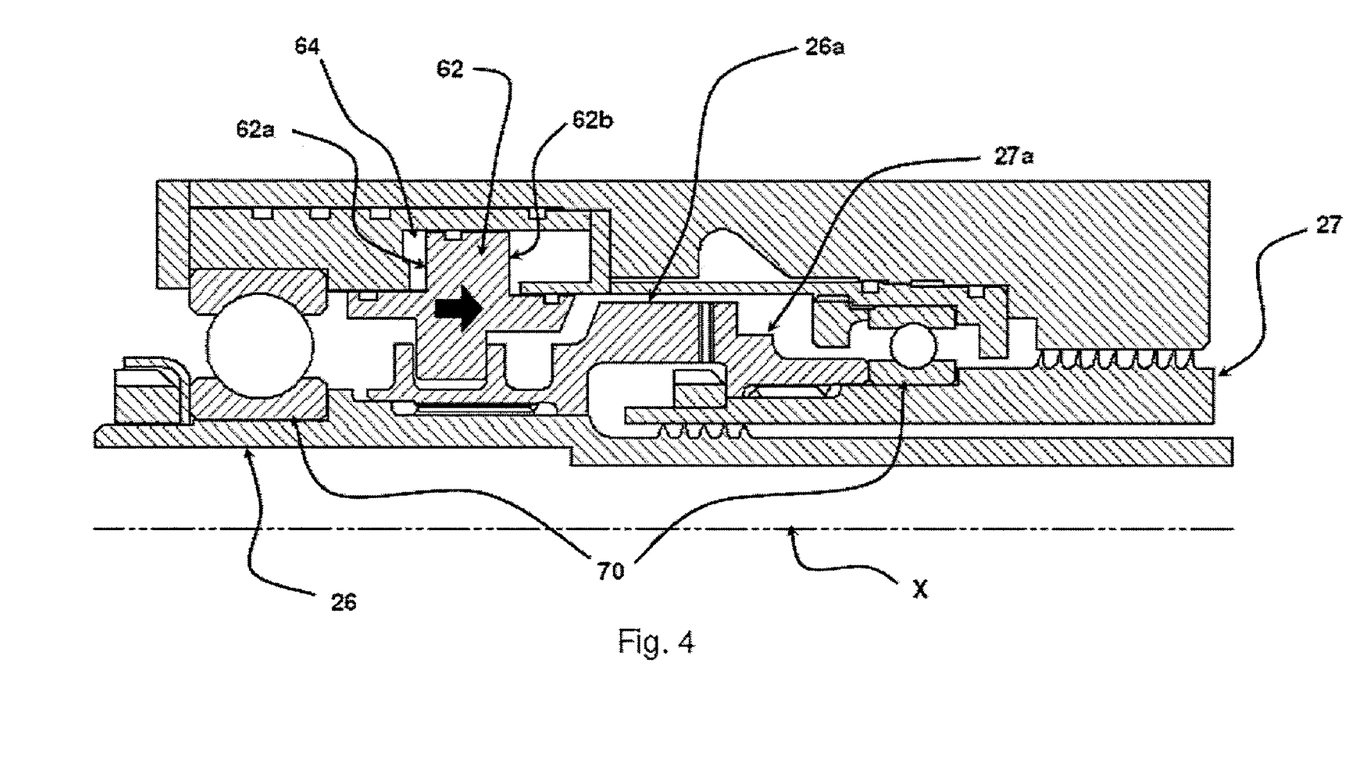
FIG. 4 depicts the engagement mechanism depicted in FIG. 2 in a coupled state.

For purposes of illustration only, in accordance with one embodiment of the invention and as depicted in FIGS. 2-5, engagement mechanism takes the form of a splined clutch mechanism 20 adapted to permit rotation of shafts 26, 27 about an axis of rotation X on bearing assemblies 70. Clutch mechanism 20 includes a first engagement dog 27a including a plurality of engagement splines affixed to shaft 27 and a second engagement dog 26a including a plurality of splines attached to shaft 26. FIG. 3 depicts the engagement mechanism 20 of FIG. 2 in a disengaged position. As depicted in FIGS. 3 and 4, engagement and disengagement of dogs 26a, 27a is accomplished by controlled movement of piston 62 within a piston housing 60 defining a cavity 64. Hydraulic fluid is pumped against either face (62a, 62b) of piston 62 to cause piston 62 to move within cavity 64. As is evident, FIG. 4 depicts piston 62 moved to a position to engage dogs 26a, 27a.

Figure 5:
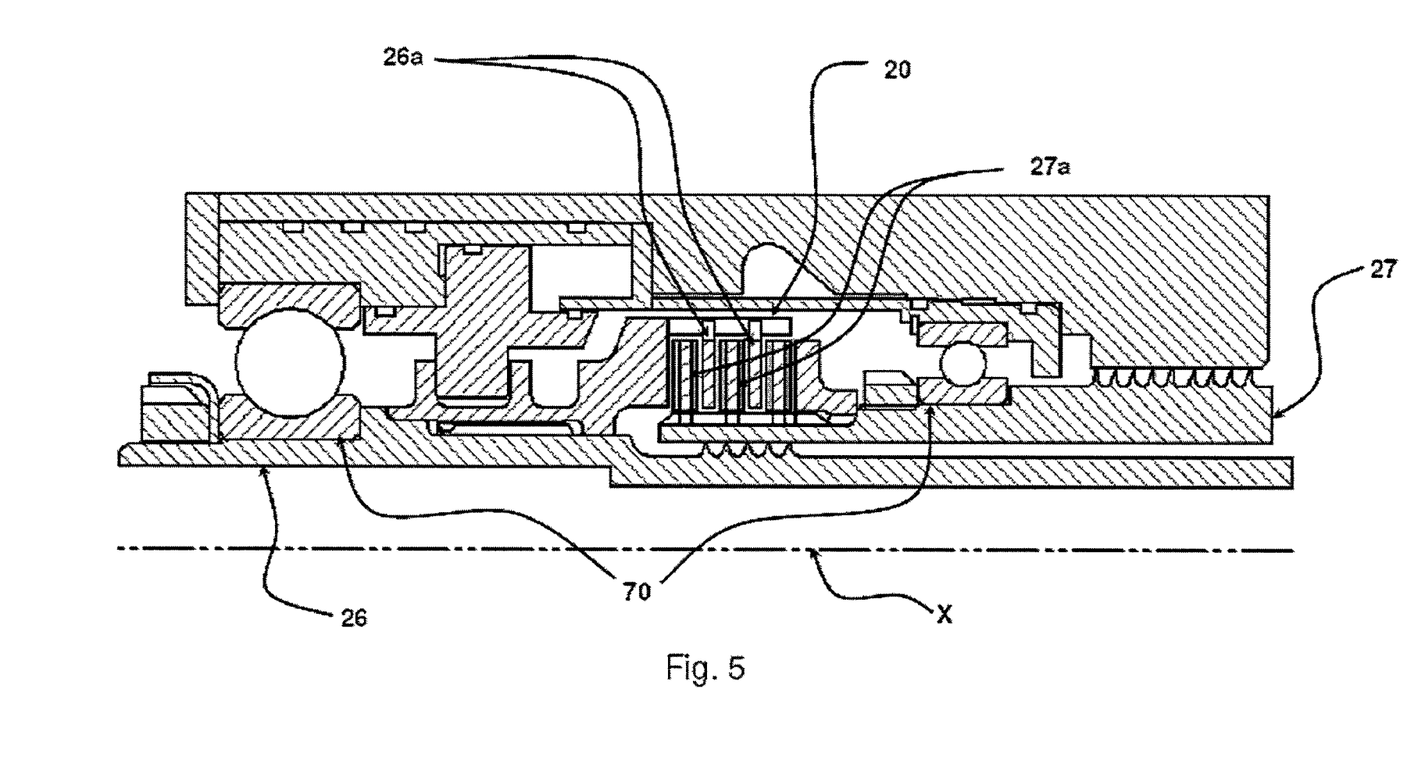
FIG. 5 is a view of a second exemplary embodiment of an engagement mechanism made in accordance with the present invention.

As depicted in FIG. 5, an alternative embodiment of an engagement mechanism 20' is depicted including a plurality of clutch plates 27a affixed to shaft 27 that may selectively engage pressure plates 26a affixed to shaft 26, clutch plates 27a and pressure plates 26a can be made from a variety of materials and be arranged in myriad configurations, as are known in the art.

It will be recognized that the engagement mechanisms depicted herein can be oriented in any suitable manner, and that the Figures depicting the exemplary embodiments are not limiting. As such, engagement mechanism 20 can take the form of any engagement mechanism that permits selective engagement of the drive shafts 26 and 27, including by way of example only, hydraulic clutches, electromagnetic engagement mechanisms, manual linkages, one way clutches, engagement dogs and the like, among others. It will be recognized that a controlled amount of slip between shafts 26 and 27 can also be provided by engagement mechanism 20, as desired and a degree of controlled slippage may be employed by the control system 40 (described below) to ensure smooth operation of the engagement mechanism 20.

For purposes of further illustration, the low pressure components (e.g., 10, 25, 19, 27) and the power components (e.g., 22, 23, 26) may rotate about substantially the same axis of rotation. In accordance with a particular embodiment of the invention, the high pressure components (e.g., 12, 16, 17) may also rotate about this axis. Alternatively, the high pressure components may rotate about an axis of rotation that is different from the axis about which the low pressure components and power components rotate. The axes may be substantially parallel to each other, substantially perpendicularly to each other, or may be oriented at any suitable angle with respect to each other. Such varying configurations of the axes can be advantageous. For example, in smaller engine systems, it may be desirable to set the high pressure components on a separate axis of rotation and duct flows of working fluid between the low and high pressure components, especially since the high pressure components tend to be smaller than the low pressure components in smaller power applications (e.g., less than 3000 H.P.). Moreover, such a design is more modular in nature, and may be easier to service and easier to incorporate into certain applications (e.g., helicopters) than a monolithic structure. In contrast, in larger systems having higher power outputs (e.g., marine and stationary power applications operating at significantly more than 3000 H.P.), the high pressure components are larger, and more suitable for integrating with the low pressure components about the same rotational axis.

For purposes of further illustration and not limitation, as further depicted in FIG. 1, a control system 40 is provided. Control system 40 is preferably adapted and configured to control fuel flowing to the combustor 14, for example, in relation to the demand of an operator. If desired, control system 40 may be further adapted to control the engine 1 in response to at least one signal representative of the speed of the first drive shaft (25, 27) and second drive shaft (23, 26). As depicted in FIG. 1, the temperature at various points in the engine 1, as well as shaft speed and the like can be detected by a plurality of sensors 42 in operable communication with the control system 40. Thus, control system 40 can additionally or alternatively control the engine 1 in response to the temperature of gases flowing through the engine 1.

In accordance with a preferred embodiment of the invention, control system 40 includes a machine readable program tangibly embodied on a computer readable medium. The program contains instructions for controlling the operation of engine 1. The program may also control the engagement and disengagement of the engagement mechanism 20 based on a desired operating condition of the engine. For example, control system 40 may be adapted to operate the engine 1 in a first operating mode wherein the engagement mechanism 20 is disengaged, and in a second operating mode wherein the engagement mechanism 20 is engaged. If desired, the operator may have the option to manually specify when the engine changes between the first operating mode and the second operating mode. As such, it is possible to have the control system 40 control as many of the operations of engine 1 as desired.

In accordance with another aspect of the invention, engines made in accordance with the invention may be incorporated into a variety of air, marine and land vehicles, or stationary power applications, as desired.

Figure 6:
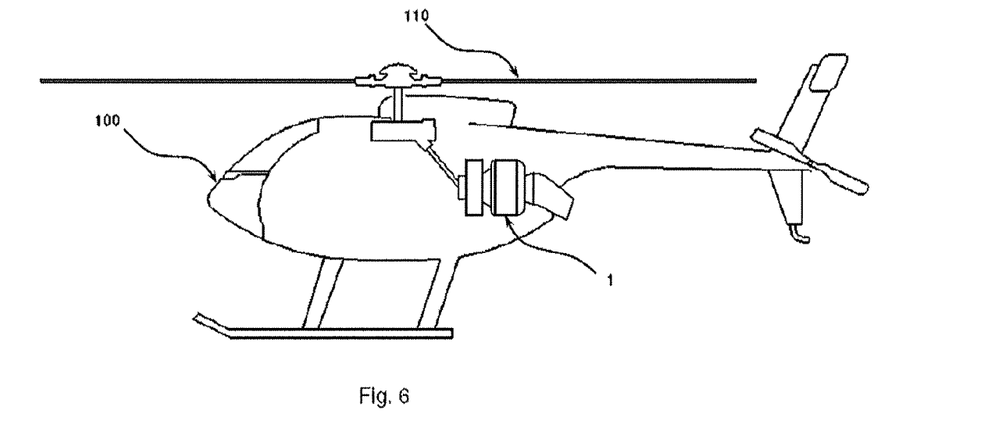
FIG. 6 is a view of a helicopter incorporating a gas turbine engine made in accordance with the invention.

For example, in accordance with one aspect of the invention and as depicted in FIG. 6, a helicopter 100 is provided including a gas turbine engine 1 as described herein, and a rotor 110 driven by the gas turbine engine 1. Preferably, the helicopter 100 operates in the first operating mode (e.g., high power) during takeoff and landing, and can operate in the second operating mode (e.g., 50% power) during a cruising operation, as desired. As will be appreciated by those of skill in the art, an engine made in accordance with the invention can provide additional flexibility to accommodate helicopters having low and/or variable cruise condition rotor speeds yet provide increased system efficiency as compared to prior art systems.

For example, an engine made in accordance with the teachings herein can provide faster response to pilot commands, when the engagement mechanism 20 is activated at higher main rotor speeds. In such conditions, the low pressure spool is operated at a higher speed and air flow rate, and the high pressure spool can provide increased power virtually instantaneously with an increase in fuel flow. This faster response to pilot commands provides increased safety and ease of operation.

Figure 7:
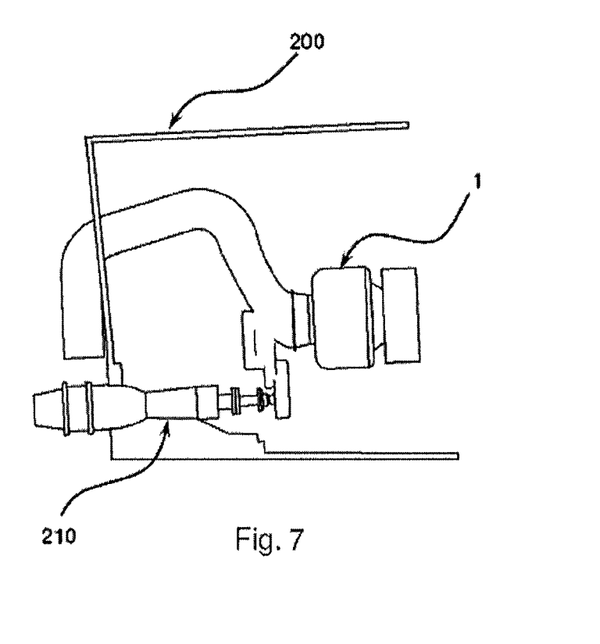
FIG. 7 is a view of a marine propulsion system incorporating a gas turbine engine made in accordance with the invention.

In accordance with another aspect of the invention, a marine propulsion system is provided. As depicted in FIG. 7, system 200 includes a gas turbine engine 1 as described herein, and a propeller 210 driven by the gas turbine engine 1. Preferably, the system 200 operates in the first (e.g., high power) operating mode when the propeller 210 is in the water, and is configured to operate in the second (e.g., 50% power) operating mode when the propeller leaves the water. Preferably, control system 40 is adapted and configured to sense when propeller 210 leaves the water to prevent the propeller from overspeeding, reducing the wear and tear on propeller.

In addition, gas turbine engines as described herein may be used in stationary or portable power applications. Engine 1 can be coupled to an electrical generator. During periods of peak electrical demand, engine can run with engagement mechanism 20 uncoupled at full power, and at lower power during non-peak periods by disengaging engagement mechanism 20.

It will also be appreciated that gas turbine engine may be incorporated into myriad land vehicles (e.g., military vehicles such as tanks, larger vehicles such as buses, high performance land vehicles, earth moving equipment, other heavy equipment, auxiliary power units and the like). Engine 1 is suitable for incorporation into essentially any system that would benefit from improved part power performance.

In accordance with yet another aspect of the invention and as depicted in FIG. 1, the gas turbine engine 1 disclosed herein may further include a heat exchanger 92 disposed between and in fluid communication with the low pressure compressor 10 and the high pressure compressor 12. The heat exchanger 92 is preferably adapted to remove heat from fluid passing from the low pressure compressor 10 to the high pressure compressor 12 to increase the efficiency of the engine 1. If desired, the engine 1 may additionally or alternatively include a heat exchanger 94 adapted to direct heat from the exhaust 24 of the engine 1 to fluid leaving the high pressure compressor 12 via path 96, thereby increasing engine efficiency.

The methods and systems of the present invention, as described above and shown in the drawings, provide for a gas turbine engine with superior properties including, but not limited to, improved part power efficiency. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:
1. A gas turbine engine, comprising:
a) an air inlet;
b) a low pressure compressor downstream from and in fluid communication with the air inlet for compressing air traversing the air inlet;
c) a combustor downstream from and in fluid communication with the low pressure compressor for combusting a fuel mixture;
d) a low pressure turbine downstream from and in fluid communication with the combustor, the low pressure turbine operably connected to the low pressure compressor by a first drive shaft, the low pressure turbine being adapted to generate power from a combusted fuel mixture passing therethrough to power the low pressure compressor;

e) a power turbine downstream from and in fluid communication with the combustor and the low pressure turbine, the power turbine being adapted to generate power to power a load external to the engine, the power turbine mounted on a second drive shaft;

f) an engagement mechanism adapted to selectively engage the first drive shaft to the second drive shaft, wherein the first drive shaft and second drive shaft rotate at substantially the same speed when the engagement mechanism is engaged, wherein the low pressure turbine and power turbine have an aerodynamic design speed such that the power turbine produces power at substantially a same speed as the low pressure turbine, thereby allowing the low pressure turbine to provide power to the output shaft when the low pressure and power turbines are selectively coupled by the engagement mechanism;

g) a high pressure compressor downstream from and in fluid communication with the low pressure compressor; and h) a high pressure turbine downstream from and in fluid communication with the combustor, the high pressure turbine operably connected to the high pressure compressor by a third drive shaft, the high pressure turbine being adapted to generate power from a combusted fuel mixture passing therethrough to power the high pressure compressor.

2. The gas turbine engine of claim 1, wherein the engagement mechanism is a clutch.

3. The gas turbine engine of claim 2, wherein the clutch includes:
   a) a first engagement dog including a first plurality of splines affixed to the first drive shaft; and
   b) a second engagement dog including a second plurality of splines affixed to the second drive shaft, wherein the first plurality of splines and second plurality of splines intermesh when the clutch is in an engaged condition.

4. The gas turbine engine of claim 2, wherein the clutch includes at least one clutch plate adapted and configured to engage at least one pressure plate to couple the first drive shaft to the second drive shaft.

5. The gas turbine engine of claim 2, wherein the clutch is a hydraulic clutch.

6. The gas turbine engine of claim 1, wherein the engagement mechanism allows a controlled amount of slippage between the first drive shaft and the second drive shaft when the engagement mechanism is engaged.

7. The gas turbine engine of claim 1, wherein the first drive shaft and second drive shaft rotate about substantially the same axis of rotation.

8. The gas turbine engine of claim 7, wherein the first drive shaft, second drive shaft and third drive shaft all rotate about substantially the same axis of rotation.

9. The gas turbine engine of claim 7, wherein the first drive shaft and second drive shaft rotate about a first axis of rotation and the third drive shaft rotates about a second axis of rotation different from the first axis of rotation.

10. The gas turbine engine of claim 9, wherein the second axis of rotation is substantially parallel to the first axis of rotation.

11. The gas turbine engine of claim 9, wherein the second axis of rotation is substantially perpendicular to the first axis of rotation.

12. The gas turbine engine of claim 1, further comprising a control system adapted to control fuel flowing to the combustor in relation to the demand of an operator, the control system being further adapted to control the engine in response to at least one of:
   i) at least one signal representative of the speed of the first drive shaft and second drive shaft; and
   ii) the temperature of gases flowing through the engine.

13. The gas turbine engine of claim 12, wherein the control system includes a machine readable program tangibly embodied on a computer readable medium, the program containing instructions for controlling the engagement and disengagement of the engagement mechanism based on the operating condition of the engine.

14. The gas turbine engine of claim 12, wherein the control system is adapted to operate the engine in a first operating mode wherein the engagement mechanism is disengaged, and a second operating mode wherein the engagement mechanism is engaged.

15. The gas turbine engine of claim 14, wherein the operator can manually specify when the engine changes between the first operating mode and the second operating mode.

16. The gas turbine engine of claim 1, further comprising a heat exchanger disposed between and in fluid communication with the low pressure compressor and the high pressure compressor, the heat exchanger being adapted to remove heat from fluid passing from the low pressure compressor to the high pressure compressor.

17. The gas turbine engine of claim 1, further comprising a heat exchanger adapted to direct heat from the exhaust of the engine to fluid leaving the high pressure compressor.

* * * * *